(12) United States Patent
Pan

(10) Patent No.: US 7,557,435 B2
(45) Date of Patent: Jul. 7, 2009

(54) MICRO-DEVICE ENCAPSULATION HAVING LIGHT AND MOISTURE CONTROL

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 52 days.

(21) Appl. No.: 11/735,469

(22) Filed: Apr. 15, 2007

(65) Prior Publication Data

US 2008/0273233 A1    Nov. 6, 2008

Related U.S. Application Data

(63) Continuation-in-part of application No. 11/690,776, filed on Mar. 23, 2007.

(51) Int. Cl.
*H01L 23/02* (2006.01)
*H01L 23/20* (2006.01)

(52) U.S. Cl. .................................. 257/678; 257/682
(58) Field of Classification Search ............... 257/678, 257/682, 729
See application file for complete search history.

(56) References Cited

U.S. PATENT DOCUMENTS

| 7,193,364 B2 | 3/2007 | Klausmann |
| 7,265,027 B2 * | 9/2007 | Yang ........................... 438/456 |

\* cited by examiner

*Primary Examiner*—William C Choi
(74) *Attorney, Agent, or Firm*—Xin Wen

(57) ABSTRACT

An encapsulated micro device includes a micro device on a substrate within a chamber, a transparent encapsulation cover in part defining the chamber, an opaque layered structure on the encapsulation cover and inside the chamber. The layered structure includes an opening over the micro device and is configured to absorb light and moisture in the chamber. A spacer wall between the substrate and the encapsulation cover in part defines the chamber.

29 Claims, 16 Drawing Sheets

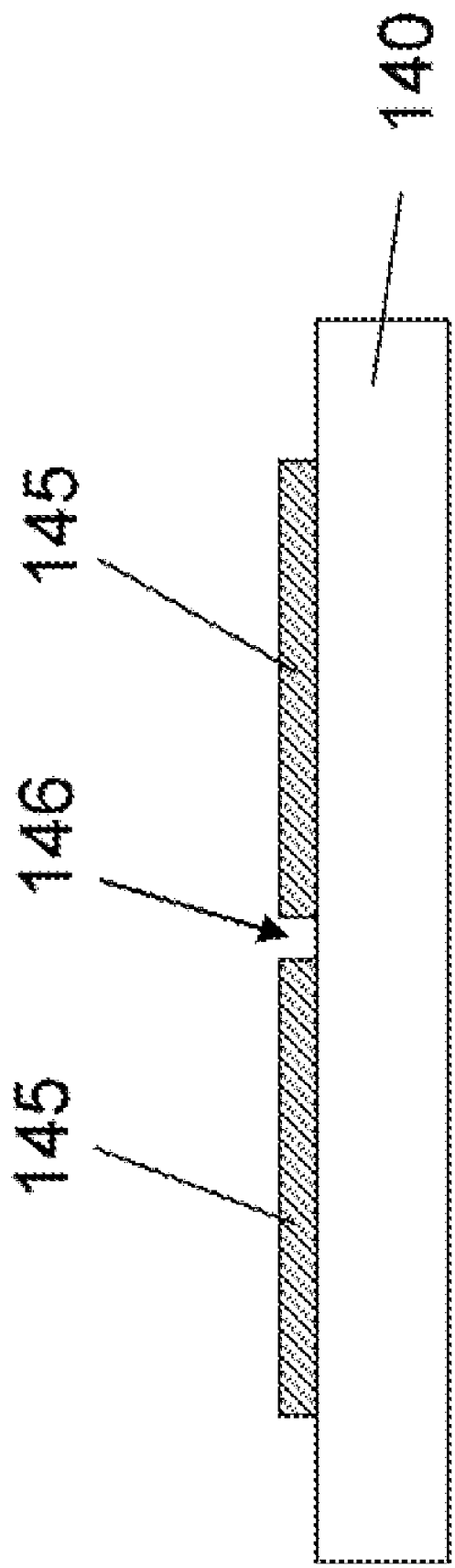

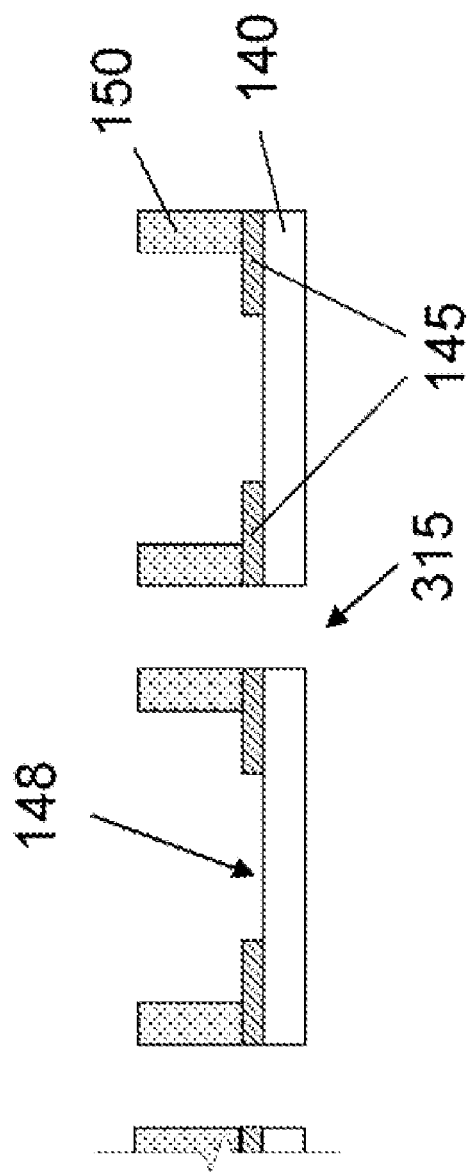
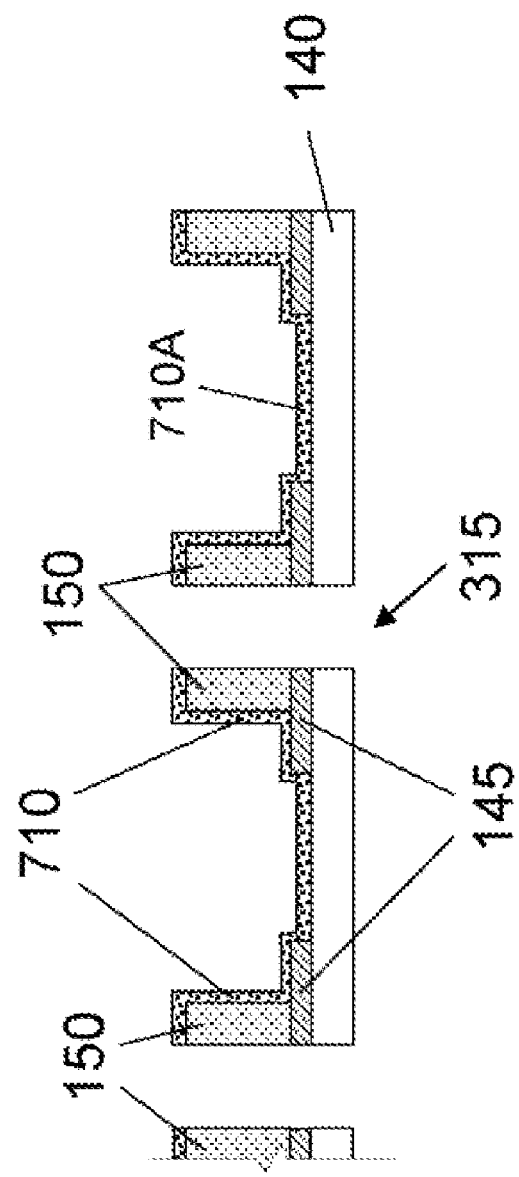
Figure 7C
Figure 7D

MICRO-DEVICE ENCAPSULATION HAVING LIGHT AND MOISTURE CONTROL

The present application is a continuation-in-part application of and claims priority to commonly assigned U.S. patent application Ser. No. 11/690,776, titled "Encapsulated spatial light modulator having improved performance" by S. Pan, filed Mar. 23, 2007, the content of which is incorporated herein by reference.

BACKGROUND

The present disclosure relates to the packaging of micro devices, in particular, the packaging of optical micro devices.

In manufacturing micro devices, multiple micro devices are commonly fabricated on a semiconductor wafer. The micro devices are then sealed in micro chambers, and subsequently separated into individual dies.

The micro chambers often include transparent windows through which the micro devices to receive and output optical signals. To ensure the optical performance of such micro devices, it is important to prevent unwanted scattered light in the micro chambers from exiting the transparent window. It is also desirable to minimize moisture content in the micro chambers because the performance of many micro devices can be affected by moisture.

SUMMARY

In one general aspect, the present invention relates to an encapsulated micro device including a micro device on a substrate within a chamber, a transparent encapsulation cover in part defining the chamber, and an opaque layered structure on the encapsulation cover and inside the chamber. The layered structure can include an opening over the micro device and is configured to absorb light and moisture in the chamber. The encapsulated micro device can also include a spacer wall between the substrate and the encapsulation cover. The spacer wall in part defines the chamber. The spacer wall has an inner surface facing the micro device In another general aspect, the present invention relates to a method for operating a tiltable mirror encapsulated in a chamber on a substrate. The method includes absorbing moisture in the chamber by an opaque layered structure on a transparent encapsulation cover, wherein the chamber is defined by the encapsulation cover and one or more spacer walls between the encapsulation cover and the substrate; tilting the tiltable mirror to an on position; reflecting a first packet of incident light off the tiltable mirror in the on position to produce a first reflected light; transmitting the first reflected light out of the chamber through an opening in the layered structure on the encapsulation cover; tilting the tiltable mirror to an off position; reflecting a second packet of incident light off the tiltable mirror in the off position to produce a second reflected light; and absorbing the second reflected light by a light absorbing material on the spacer wall and inside the chamber.

In another general aspect, the present invention relates to a method for fabricating an encapsulation device for encapsulating a micro device. The method includes holding a shadow mask over an encapsulation cover having a plurality of openings, wherein the shadow mask includes a base mask portion, one or more openings in the base mask portion, a central mask portion, and one or more connector portions connecting the central mask portion to the base mask portion; aligning the position of the shadow mask relative to one or more openings in the encapsulation cover; depositing one or more target materials through the one or more openings in the shadow mask to form a layered structure on the encapsulation cover, wherein the layered structure includes an opening defined by the central mask portion of the shadow mask, and forming one or more spacer walls on the layered structure on the encapsulation cover. The method can further include connecting the spacer walls to a surface of a substrate having one or more micro devices to form a plurality of chambers on the substrate with each chamber including at least one micro device.

Implementations of the system may include one or more of the following features. The layered structure can include a single layer. The layered structure can include a zirconium compound or amorphous carbon. The layered structure can include an opaque aperture layer on the encapsulation cover and a second layer on the aperture layer, the second layer being configured to absorb light and moisture in the chamber. The second layer can include a zirconium compound or amorphous carbon. The encapsulated micro device can further include a material configured to absorb light and moisture in the chamber, the material being on the inner surface of the spacer wall. The material can include a zirconium compound or amorphous carbon. The micro device can be a spatial light modulator. The micro device can include a tiltable mirror configured to tilt to an on position and an off position. The tiltable mirror can reflect light out of the chamber through the opening in the layered structure when the tiltable mirror is at the on position, and can reflect light toward a light absorbing material in the chamber when the tiltable mirror is at the off position wherein reflected light is absorbed by the light absorbing material.

Various implementations of the methods and devices described herein may include one or more of the following advantages. The disclosed encapsulated micro devices can have improved mechanical and optical performance. The adhesion problem in some convention micro devices can be prevented by reducing moisture content in the micro chamber using a moisture-absorbing layer on one or more surfaces in the chamber. Furthermore, the disclosed micro devices are simpler to fabricate because the aperture layer and the moisture-absorbing layer can be combined into a single layer on an internal surface of the encapsulation cover. Another advantage of the disclosed systems and methods is that the aperture layer can be positioned on the encapsulation cover with high precision.

The disclosed micro devices can also have improved optical performance. Unwanted light may be absorbed in a micro chamber that encapsulates the micro device. The optical noise in the output optical signal can therefore be reduced. The contrast between an "on" state and an "off" state of the micro device may also be increased. The specification also discloses manufacturing processes for encapsulation devices that include light absorbing components that can absorb the unwanted light in the chambers. Furthermore, a plurality of micro devices on a substrate can be encapsulated in a common process. The manufacturing efficiency is thus improved.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

FIG. 1C is an inverted cross-sectional view of the encapsulation cover along the line B-B in FIG. 1A.

FIGS. 7C-7I are cross-sectional views along the line A-A in FIG. 6A, showing the steps of fabricating an encapsulation device and encapsulating a micro device on a substrate using the encapsulation device.

DETAILED DESCRIPTION

Figure 1A:
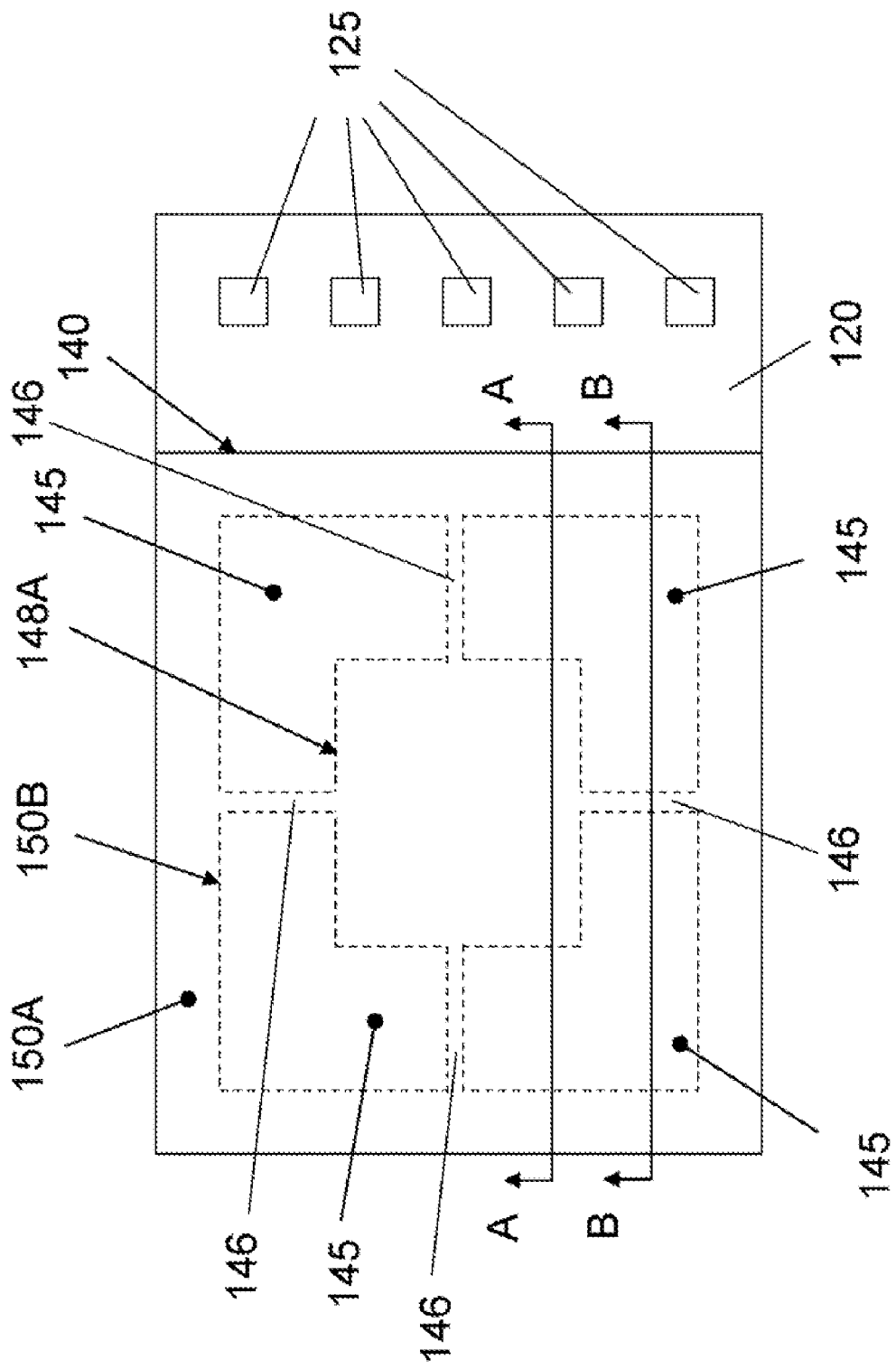
FIG. 1A is a schematic top view of an exemplary micro device encapsulated in a chamber.
Figure 1B:
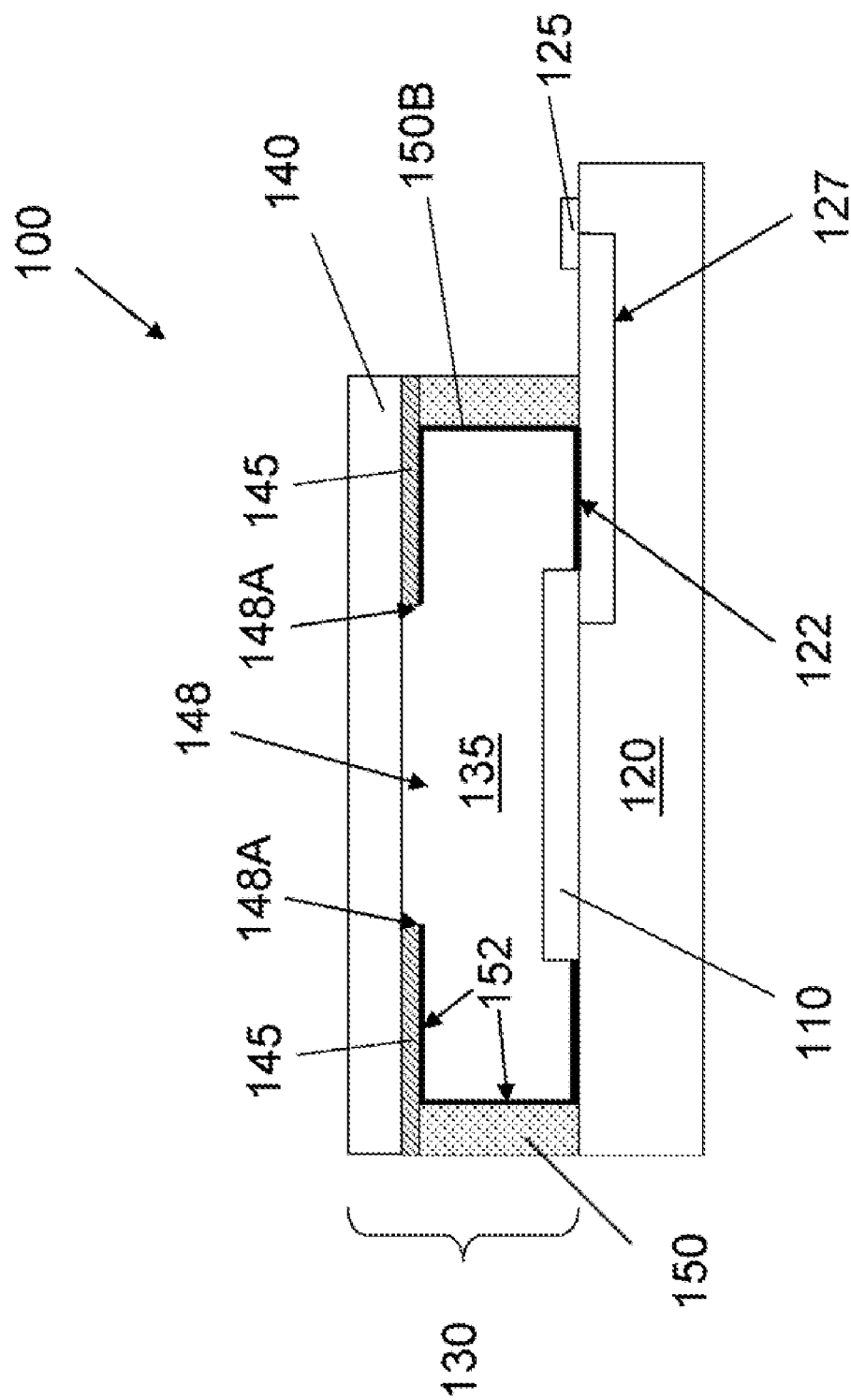
FIG. 1B is a schematic cross-sectional view of the exemplary micro device encapsulated in the chamber along line A-A in FIG. 1A.

Referring to FIGS. 1A and 1B, an encapsulated micro device 100 includes a micro device such as a spatial light, modulator 110 formed or mounted onto a substrate 120. The spatial light modulator 110 can be mounted on the substrate 120 by wire bonding or flip-chip bonding. The spatial light modulator 110 can also be formed in one or more layers on a wafer. The substrate 120 can include an electric circuit. 127 that electrically connects the spatial light modulator 110 to electric contacts 125 (outside of a chamber 135). The electric contacts 125 allow the spatial light modulator 110 to receive external electric signals or to output electric, signals. The electric circuits 127 can, for example, include conductor-metal-oxide semiconductor (CMOS) transistors.

The spatial light modulator 110 is encapsulated by an encapsulation device 130 in a chamber 135. The encapsulation device 130 can include an encapsulation cover 140 that can be made of a material that is transparent to visible, UV, or IR light. An aperture layer 145 can be formed on the lower surface of an encapsulation cover 140. The aperture layer 145 can be made of an opaque material that is also capable of absorbing moisture from the environment. Materials suitable for the aperture layer 145 include zirconium compounds such as zirconium oxide and zirconium nitride. The aperture layer 145 can include micro pores that can absorb and store moisture. An additional layer 152 of light absorbing material can be formed on the aperture layer 145 and outside of the spacer walls 150. The light absorbing material can also be capable of absorbing moisture. The light absorbing material can include zirconium compounds such as zirconium oxide and zirconium nitride, and amorphous carbon. In some embodiments, the material compositions for the aperture layer 145 and the layer 152 can be substantially the same, in this case, the aperture layer 145 and the layer 152 can form a single layer.

In some embodiments, the aperture layer 145 can also be made of other opaque materials such as chromium oxide. The lower surface of the aperture layer 145 can be coated with a layer 152 of a light absorbing material that can also absorb moisture, which for example can include zirconium compounds such as zirconium oxide and zirconium nitride, and amorphous carbon.

An aperture 148 in the aperture layer 145 above the spatial light modulator 110 defines a transparent window for optical communications between the spatial light modulator 110 and outside of the chamber 135. The aperture 148 is defined by aperture boundary 148A. As shown in FIGS. 1A and 1C, the aperture layer 145 can include a plurality of portions separated by recess channels 146. (The recess channels 146 correspond to the connector portions 706a of the shadow mask 700, shown in FIGS. 7A and 7B.)

The encapsulation device 130 can also include spacer walls 150 that are connected to the aperture layer 145 of the encapsulation cover 140 and to the substrate 120. The spacer walls 150 include internal surfaces 150B facing the spatial light modulator 110. For example, the spacer walls 150 can be sealed to the substrate 120 by a polymer adhesive or bonded to the substrate 120 by plasma in the contact areas 150A (the contact areas between the spacer walls 150 and the encapsulation cover 140 or the substrate 120). The spacer walls 150 can be made of an inorganic material, such as glass. The height of the spacer walls 150 can be about 0.2 to 2.0 microns, or 0.5 to 1 micron. The encapsulation cover 140 can optionally include antireflective coatings on the upper or the lower surfaces.

The surfaces of the spacer walls 150 inside the chamber 135 are also coated by a layer 152 of a light absorbing material. Optionally, an outside surface of the spacer walls 150 may also be coated by a layer of light absorbing material. In some embodiments, the light absorbing material absorbs light more efficiently than the aperture layer 145. The upper surfaces of the substrate 120 that is outside of the spatial light modulator 110 and inside the chamber 135 are also coated with a layer 122 of a light absorbing material, as shown in FIG. 1B. The light absorbing materials on the layer 122, the layer 152, and the aperture layer 145 can include materials that can also absorb moisture, for example, a zirconium compound such as zirconium oxide and zirconium nitride, and amorphous carbon.

Figure 2A:
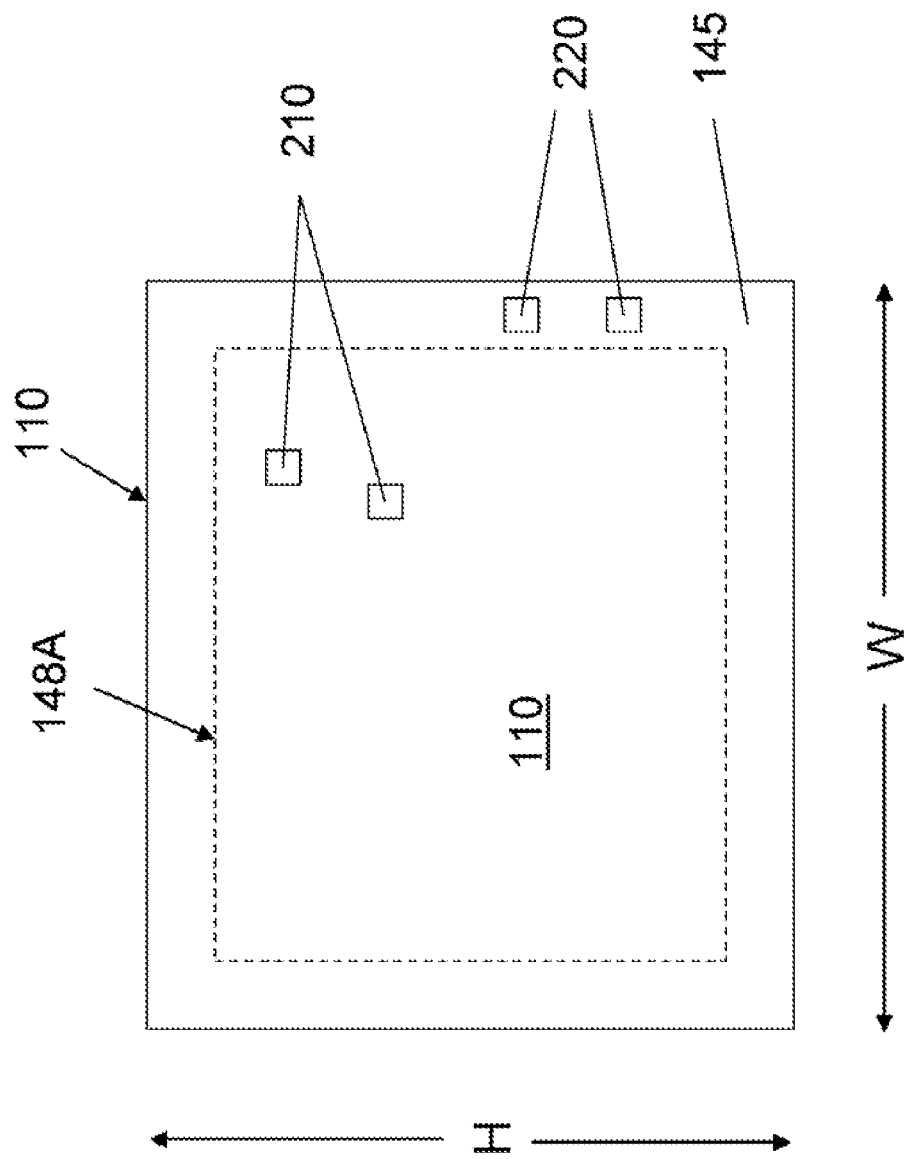
FIG. 2A is a schematic of an enlarged top view of a spatial light modulator including an array of pixel cells each including a micro mirror.

Referring to FIG. 2A, the spatial light modulator 110 can include a plurality of pixel cells 210, 220 that can be distributed in an array that is characterized by two lateral dimensions "W" and "H" (only a few pixel cells are shown for the sake of simplicity). Some pixel cells 210 are under the aperture 148 defined by the aperture boundary 148A. The pixel cells 210 are thus under the window defined by the aperture 148 and can easily receive or output optical signals from or to the outside of the chamber 135.

In some embodiments, some other pixel cells 220 in the spatial light modulator 110 are positioned under the aperture layer 145. The pixel cells 220 are not used for optical communications or light modulations during device operation. The pixel cells 220 can be referred as dummy pixel cells. One purpose for the dummy pixel cells is to overcome possible registration error between the aperture 148 and the spatial light modulator 110. When an encapsulation device 130 is bonded to the substrate 120, small alignment errors may occur in the relative lateral positions between the spatial light modulator 110 and the aperture 148. If the active area of the spatial light modulator 110 is made exactly same size as that of the aperture 148, a small lateral misalignment between the spatial light modulator 110 and the aperture 148 can produce an inactive area inside the aperture 148, that is, certain areas under the aperture 148 may not include pixel cells for optical communications such as spatial light modulations. The array of the pixel cells 210, 220 in the spatial light modulator 110 is therefore made larger than the aperture 148 to ensure the pixel cells 210, 220 fill the area within the aperture boundary 148 despite potential alignment errors. In other words, at least one of the lateral dimensions "W" and "H" of the array of pixel cells 210 and 220 is wider than the corresponding width of the opening 148.

Figure 2B:
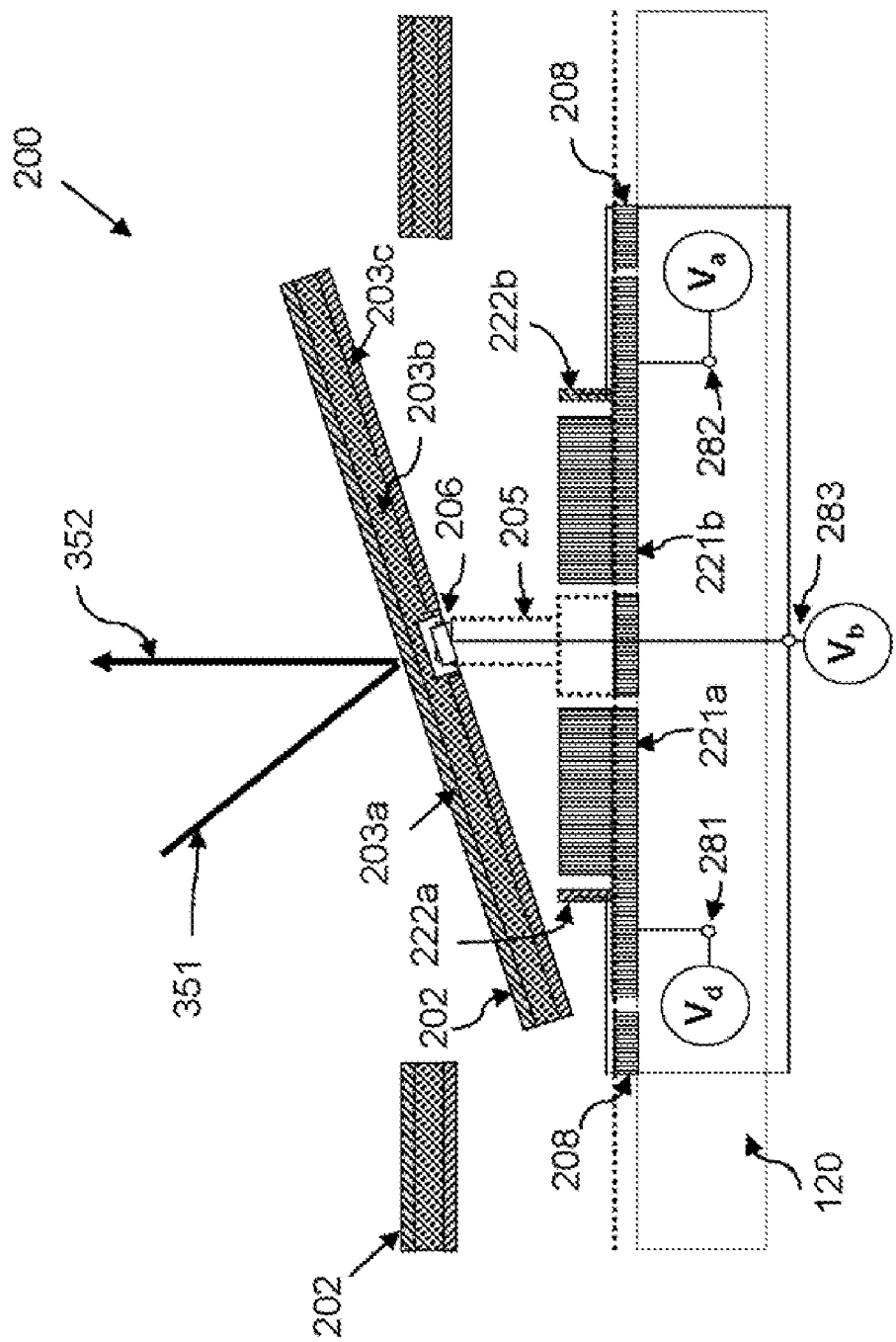
FIG. 2B is a cross-sectional view of an exemplary micro minor in the spatial light modulator of FIG. 2A.

Referring to FIG. 2B, a pixel cell 210 or 220 can include a tiltable micro mirror 200. The tiltable micro mirror 200 can include a mirror plate 202 that includes a flat reflective upper layer 203a, a middle layer 203b that provides the mechanical strength for the mirror plate, and a bottom layer 203c. The upper layer 203a can be formed of a reflective material such as aluminum, silver, or gold. The layer thickness can be in the range of between about 200 and 1000 angstroms, such as about 600 angstroms. The middle layer 203b can be made of a silicon based material, for example, amorphous silicon, typically about 2000 to 5000 angstroms in thickness. The bottom layer 203c can be made of an electrically conductive material that allows the electric potential of the bottom layer 203c to be controlled relative to the step electrodes 221a or 221b. The bottom layer 203c can be made of titanium and have a thickness in the range of about 200 to 1000 angstroms.

A hinge 206 is connected with the bottom Saver 203c (the connections are out of plane of view and are thus not shown in FIG. 2B). The hinge 206 is supported by a hinge post 205 that is rigidly connected to the substrate 120. The mirror plate 202 can include two hinges 206 connected to the bottom layer 203c. The two hinges 206 define an axis about which the mirror plate 202 can be tilted. The hinges 206 can extend into cavities in the lower portion of mirror plate 202. For ease of manufacturing, the hinge 206 can be fabricated as part of the bottom layer 203c.

Step electrodes 221a and 221b, landing tips 222a and 222b, and a support frame 208 can also be fabricated over the substrate 120. The heights of the step electrodes 221a and 221b can be in the range from between about 0.2 microns and 3 microns. The step electrode 221a is electrically connected to an electrode 281 whose voltage Vd can be externally controlled. Similarly, the step electrode 221b is electrically connected with an electrode 282 whose voltage Va can also be externally controlled. The electric potential of the bottom layer 203c of the mirror plate 202 can be controlled by an electrode 283 at potential Vb.

Bipolar electric pulses can individually be applied to the electrodes 281, 282, and 283. Electrostatic forces can be produced on the mirror plate 202 when electric potential differences are created between the bottom layer 203c on the mirror plate 202 and the step electrodes 221a or 221b. An imbalance between the electrostatic forces on the two sides of the mirror plate 202 causes the mirror plate 202 to tilt from one orientation to another.

The landing tips 222a and 222b can have a same height as that of a second step in the step electrodes 221a and 221b for manufacturing simplicity. The landing tips 222a and 222b provide a gentle mechanical stop for the mirror plate 202 after each tilt movement. The landing tips 222a and 222b can also stop the mirror plate 202 at a precise angle. Additionally, the landing tips 222a and 222b can store elastic strain energy when they are deformed by electrostatic forces and convert the elastic strain energy to kinetic energy to push away the mirror plate 202 when the electrostatic forces are removed. The push-back on the mirror plate 202 can help separate the mirror plate 202 and the landing tips 222a and 222b. Alternatively, the micro mirror 200 can be formed without landing tips 222a and 222b.

Details about the structures and operations of micro mirrors are disclosed for example in commonly assigned U.S. Pat. No. 7,167,298, titled "High contrast spatial light modulator and method" and U.S. patent application Ser. No. 11/564,040, entitled "Simplified manufacturing process for micro mirrors", filed Nov. 28, 2006, the content of which are incorporated herein by reference.

Figure 3B:
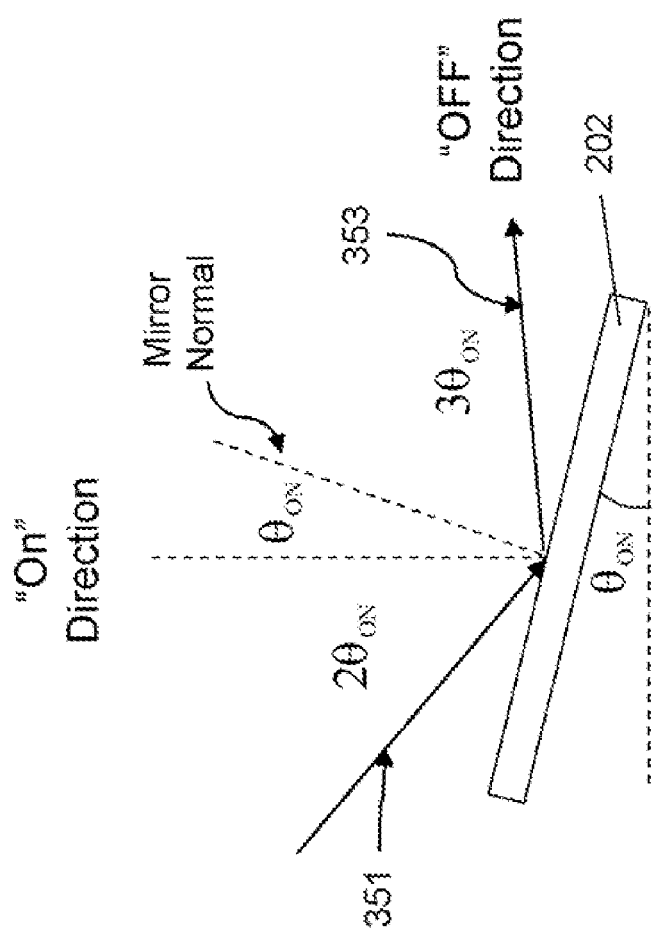
FIGS. 3A and 3B illustrate directions of incident light and reflected light when a micro mirror plate in a pixel cell of a spatial light modulator is tilted to an "on" and an "off" direction respectively.
Figure 3A:
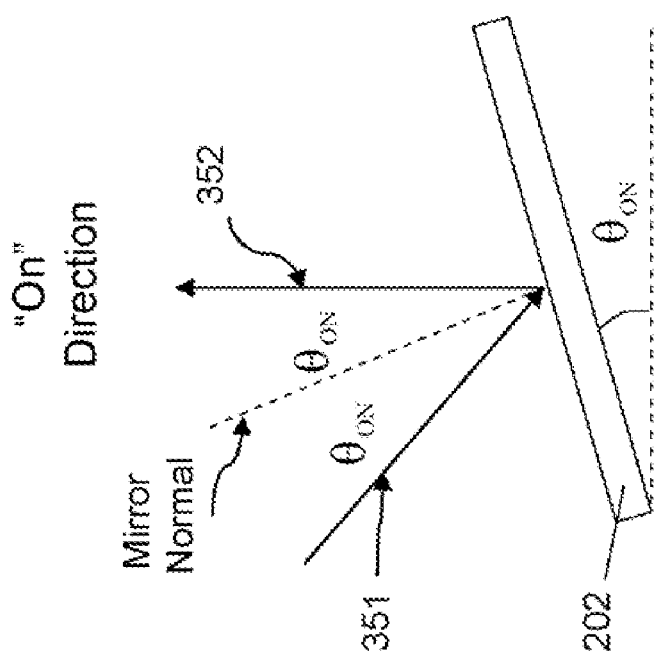

Referring to FIGS. 3A and 3B, the un-tilted position for the mirror plate 202 is typically the horizontal direction parallel to the upper surface of the substrate 120. The mirror plate 202 can be tilted by a tilt angle $\theta_{on}$ from the un-tilted position to an "on" position. The flat reflective upper layer of the mirror plate 202 can reflect the incident light 351 to produce the light 352 along the "on" direction. Since the incident angle (i.e., the angle between the incident light 330 and the mirror normal direction) and the reflection angle (i.e. the angle between the reflected light 340 and the mirror normal direction) are the same, the incident light 330 and the reflected light 340 form an angle $2\theta_{on}$ that is twice as large as the tilt angle $\theta_{on}$ of the mirror plate 202. The "on" direction is typically configured to be perpendicular to the substrate 120.

The mirror plate 202 can be symmetrically tilted in an opposite direction to an "off" position. The mirror plate 202 can reflect the incident light 351 to form reflected light 353 traveling in the "off" direction. Because the incident angle for the incident light 330 is $3\theta_{on}$, the reflection angle should also be $3\theta_{on}$. Thus the angle between the light 352 and the light 353 is $4\theta_{on}$, four times as large as the tilt angle $\theta_{on}$ of the mirror plate 202. Typically, the tiltable micro mirror 200 is designed to produce the light 353 that travels substantially in the lateral direction.

Figure 4:
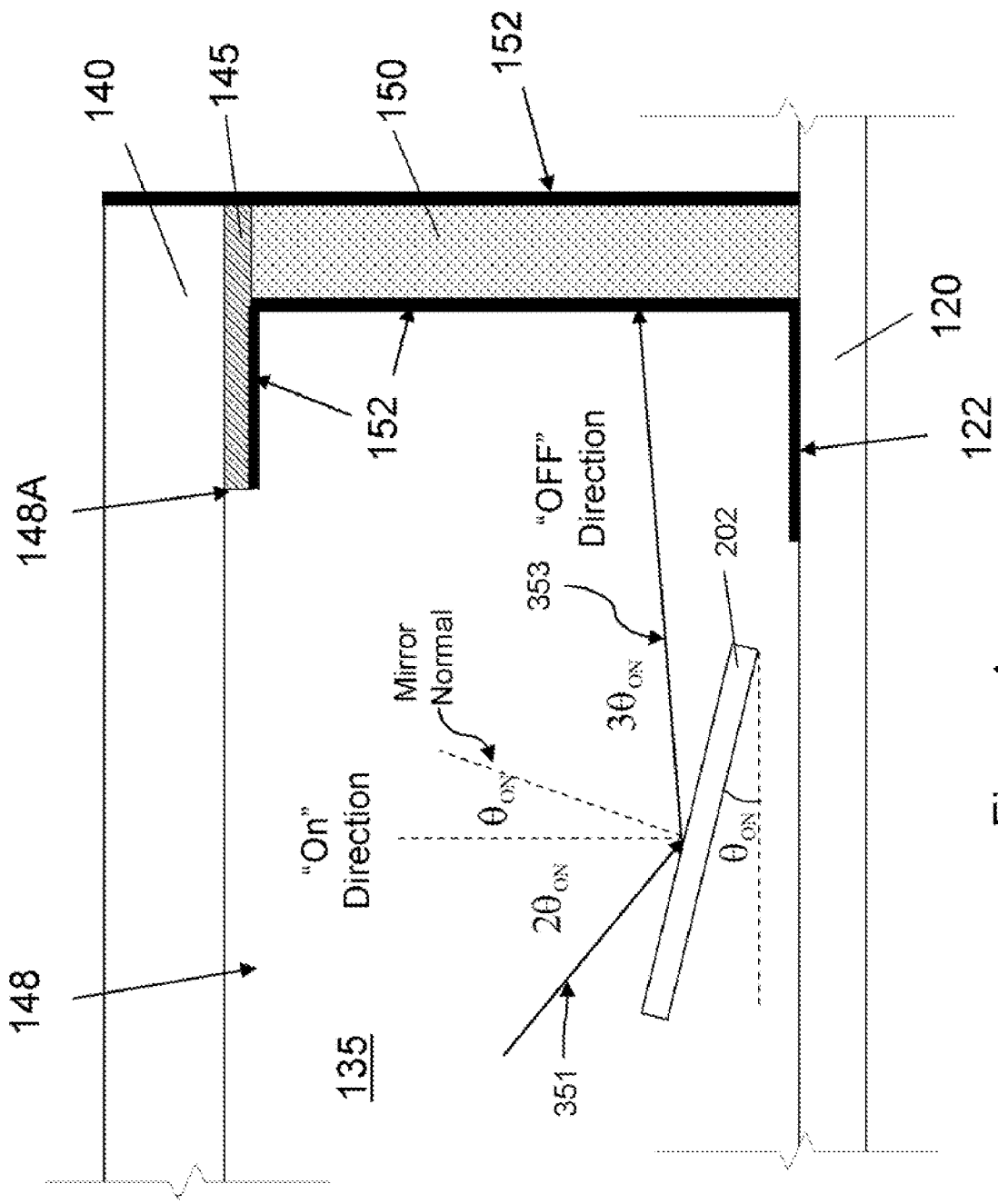
FIG. 4 is a schematic diagram showing incident light and reflected light in the chamber when a micro mirror plate in a pixel cell of a spatial light modulator is tilted to an "off" direction.

Referring to FIG. 4, the light 353 reflected by the mirror plate 202 can travel in the "off" direction inside the chamber 135 (FIG. 4 illustrates only a single mirror plate for clarity; all of the mirror plates of the spatial light modulator would similarly be positioned in the chamber 135). The light 353 can impinge on the layer 152 of light absorbing material coated on the internal surfaces of the spacer walls 150 and be absorbed by the light absorbing material in the layer 152. Other unwanted light, in the chamber 135 can include light scattered by the surfaces and objects in the chamber 135. The unwanted light can also be absorbed by the layer 122 on the surface of the substrate 120 and the aperture layer 145 on the lower surface of the encapsulation cover 140. When the mirror plate 202 is tilted to an "off" direction, it is desirable that no light can travel outside of the chamber 135 through the aperture 148. An important measure for the performance of the spatial light modulator 110 is the ratio of the output light intensities when the mirror plate is tilted to the "on" and the "off" directions. The effective absorption of light 353 and other unwanted light in the chamber 135 in the disclosed system can significantly reduce the unwanted light exiting the aperture 148 when the mirror pale is tilted to an "off" position. The contrast and the performance of the spatial light modulator 110 can thus be improved.

Figure 5:
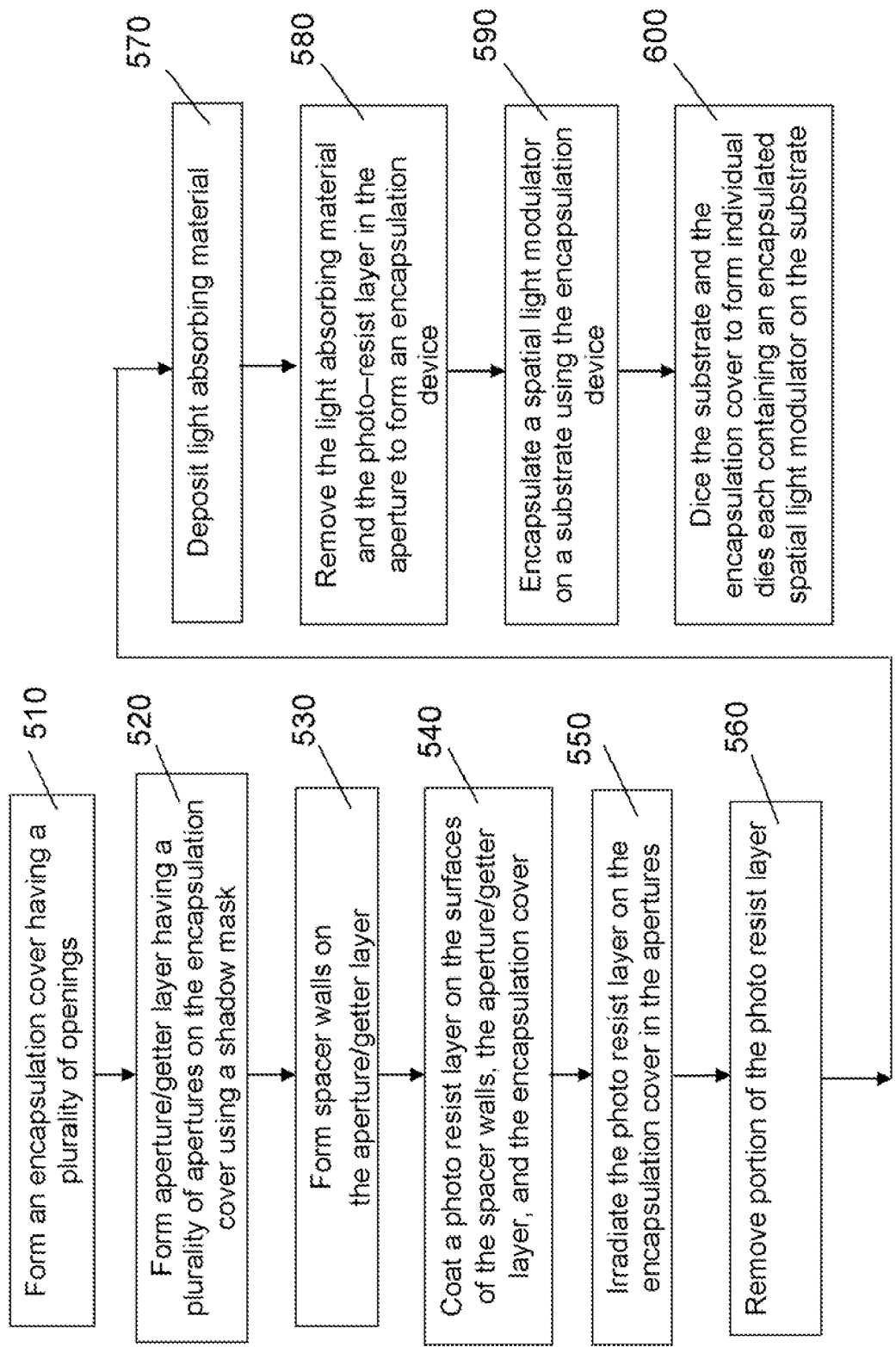
FIG. 5 is a flowchart showing the steps of fabricating an encapsulation device and encapsulating a micro device on a substrate using the encapsulation device.

FIG. 5 is a flowchart showing the steps of fabricating an encapsulation device 130 having an aperture layer, and encapsulating a spatial light modulator 110 on a substrate 120 using the encapsulation device 130.

Figure 6A:
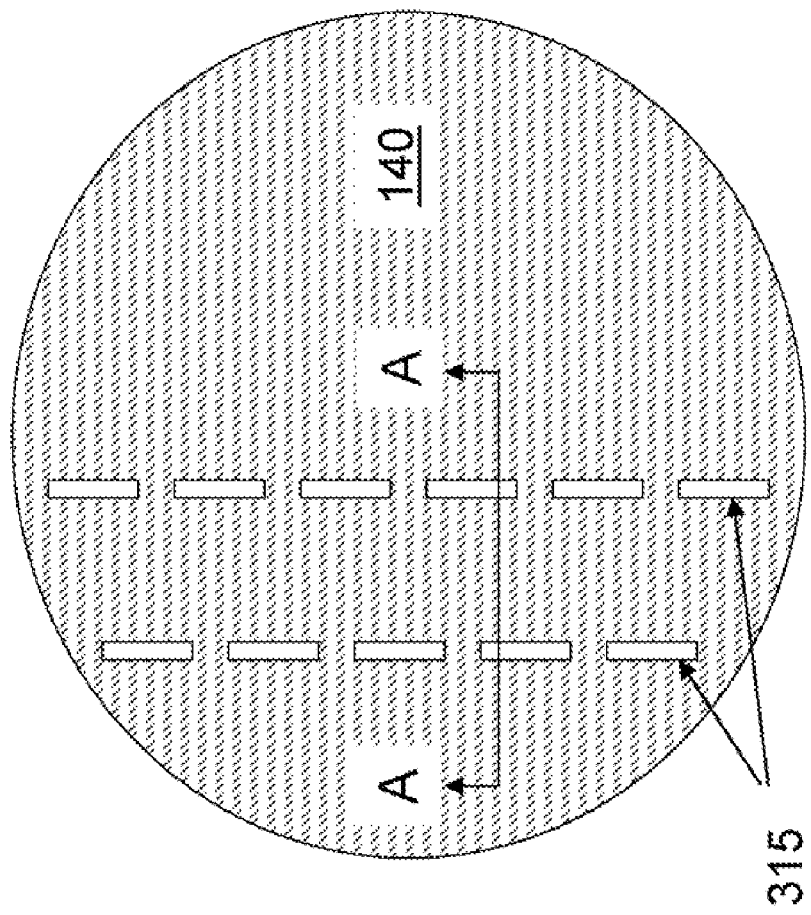
FIG. 6A is a top view of an encapsulation cover assembly.
Figure 6B:
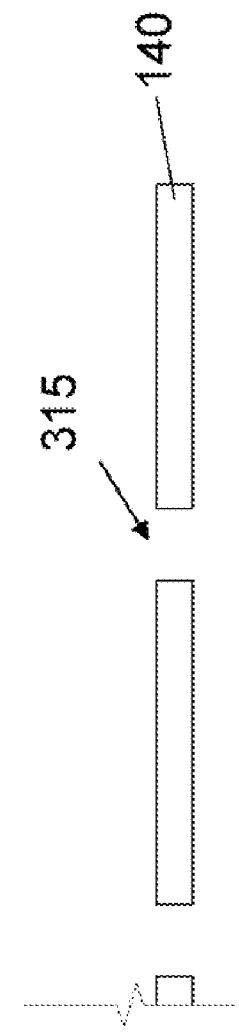
FIG. 6B is a cross-sectional view of an encapsulation cover assembly of FIG. 6A along A-A in FIG. 6A.

Referring to FIGS. 6A and 6B, an encapsulation cover 140 having a plurality of openings 315 is first provided (step 510). As described above, the encapsulation cover 140 is made of a transparent material. Each opening 315 between chambers 135 can be defined by the intact portions of the cover 140. The openings 315 are provided for accessing the electric contacts 125 on the substrate 120 after the spatial light modulators 110 are encapsulated in chambers 135.

Figure 7A:
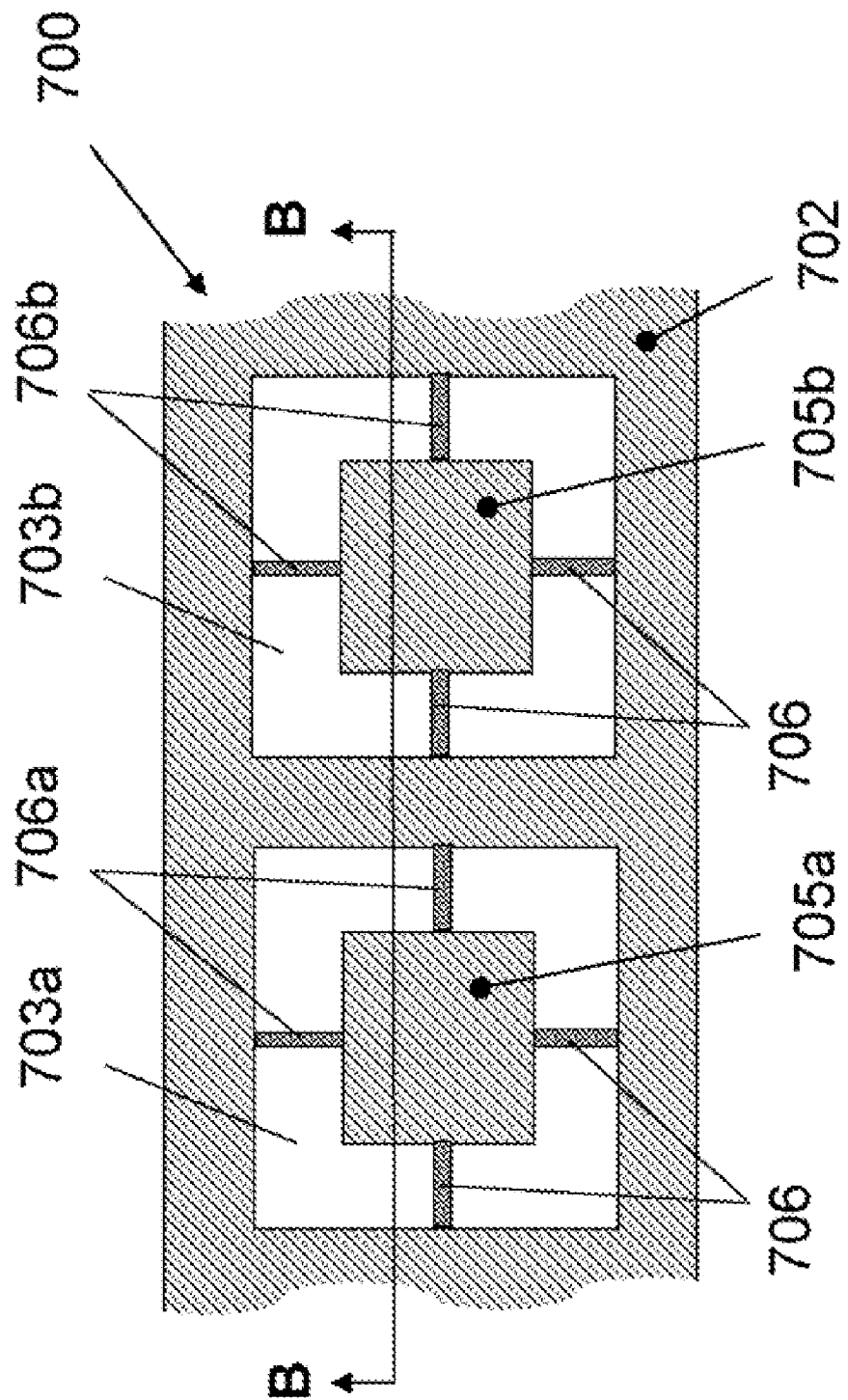
FIG. 7A is a top view of a portion of a shadow mask for producing an aperture layer on an encapsulation cover.
Figure 7B:
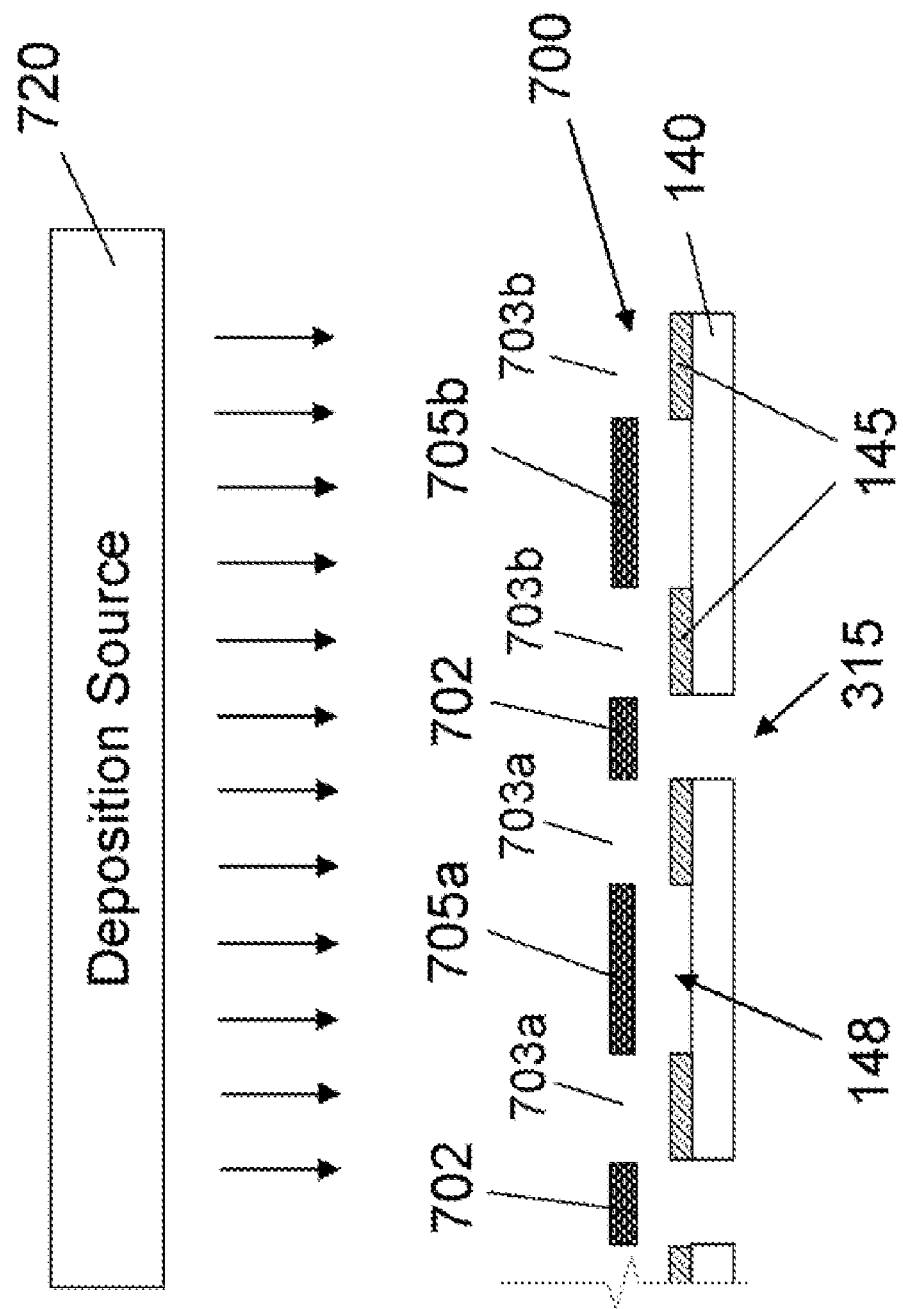
FIG. 7B is a cross-sectional view showing the step of material deposition to form an aperture layer on the encapsulation cover of FIG. 6A using a shadow mask. The cross-section of the substrate is along the line A-A in FIG. 6A. The cross-section of the shadow mask is along the line B-B in FIG. 7A.

An opaque aperture layer 145 is next formed on a surface of the encapsulation cover 140 using a shadow mask 700 using physical vapor deposition (PVD) (FIGS. 7A and 7B, step 520). The shadow mask 700 (shown as a cross-sectional view along the line B-B in FIG. 7A) includes a base mask portion 702 and a plurality of openings 703a, 703b in the base mask portion 702. The shadow mask 700 also includes central mask portions 705a, 705b that are respectively connected to the base mask, portion 702 by connector portions 706a, 706b.

The shadow mask 700 is held over the encapsulation cover 140 (shown as a cross-sectional view along the line A-A in FIG. 6A). The lateral positions of the shadow mask 700 is aligned and registered relative to the openings 315 in the encapsulation cover 140 such that the aperture layer 145 and the aperture 148 can be accurately positioned on the encapsulation cover 140 for each chamber 135.

A deposition source 720 can provide one or more target materials such as zirconium, chromium, carbon, and so on. The target material can be mounted on a backing plate. The deposition source 720 can also include a magnetron that includes magnets of opposite polarities can be mounted behind the backing plate or next to the targets. During deposition, a voltage bias between the target and the deposition chamber can cause bombardment of the target surfaces by accelerated electrons. The magnetron can produce magnetic field to trap electrons and to maintain a plasma gas near the surface of the target. The materials sputtered by the electron bombardment are deposited through the openings 703a, 703b on the encapsulation cover 140. The central mask portions 705a, 705b can block the sputtered materials from being deposited in the areas of the encapsulation cover 140 for the apertures 148. The aperture layer 145 is deposited on the encapsulation cover 140. The deposition can be conducted in a vacuum chamber or a chamber that can be filled with oxygen or nitrogen gas. The aperture layer 145 can thus be made of zirconium compounds such as zirconium oxide and zirconium nitride, or chromium oxide.

The base mask portion 702 can block the sputtered material from being deposited into the openings 315 and in the areas of the encapsulation cover 140 that are between chambers 135. The base mask portion 702 can also block the sputtered material from being deposited in the contact areas 150A that is to be the interface between the encapsulation cover 140 and the spacer walls 150, where a getter or an aperture layer is not needed.

The opening 703a, the central mask portion 705a, and the connector portion 706a can define the pattern of the aperture layer 145 corresponding to one chamber 135. The opening 703b, the central mask portion 705b, and the connector portion 706b can define the pattern of the aperture layer 145 corresponding to a different chamber 135. The pattern of the aperture layer 145, as shown in FIG. 1A, mimics the openings 703a, the central mask portion 705a, and the connector portion 706a in the shadow mask 700. For each chamber 135, the aperture layer 145 can include plurality of portions separated by recess channels 146. The recess channels 146 correspond to the connector portions 706a of the shadow mask 700.

The aperture layer 145 can include a single layer of a substantially uniform material composition that can be formed by PVD. Alternatively, the aperture layer 145 can also include more than multiple layers. For example, the aperture layer 145 can include a first layer on the encapsulation cover 140 that can be used primarily for blocking light, and a second layer on the first layer that is used primarily for absorbing moisture.

A plurality of spacer walls 150 are next formed on the patterned aperture layer 145 (FIG. 7C, step 530). The spacer walls 150 surround the apertures 148. Spacer walls 150 are also on at least one side of the opening 315, that is, at least a portion of the spacer wall is positioned adjacent to an opening 315. Examples of the materials for the spacer walls 150 can include a metal such as nickel, and copper. The spacer wails 150 can be formed by first forming a conductive layer on the encapsulation cover 140. A mask layer can then be formed on the conductive layer. The mask layer can have openings in the area where the spacer walls are to be built. The spacer walls are then formed in the openings by electrochemical plating. The spacer walls 150 can be formed by successive formation of a plurality of layers. Details about forming spacer walls using electrochemical plating are disclosed in commonly assigned pending U.S. Ser. No. 11/680,600, entitled "Fabricating tall micro structure", filed Feb. 28, 2007, this disclosure of which is incorporated herein by reference.

Figure 7E:
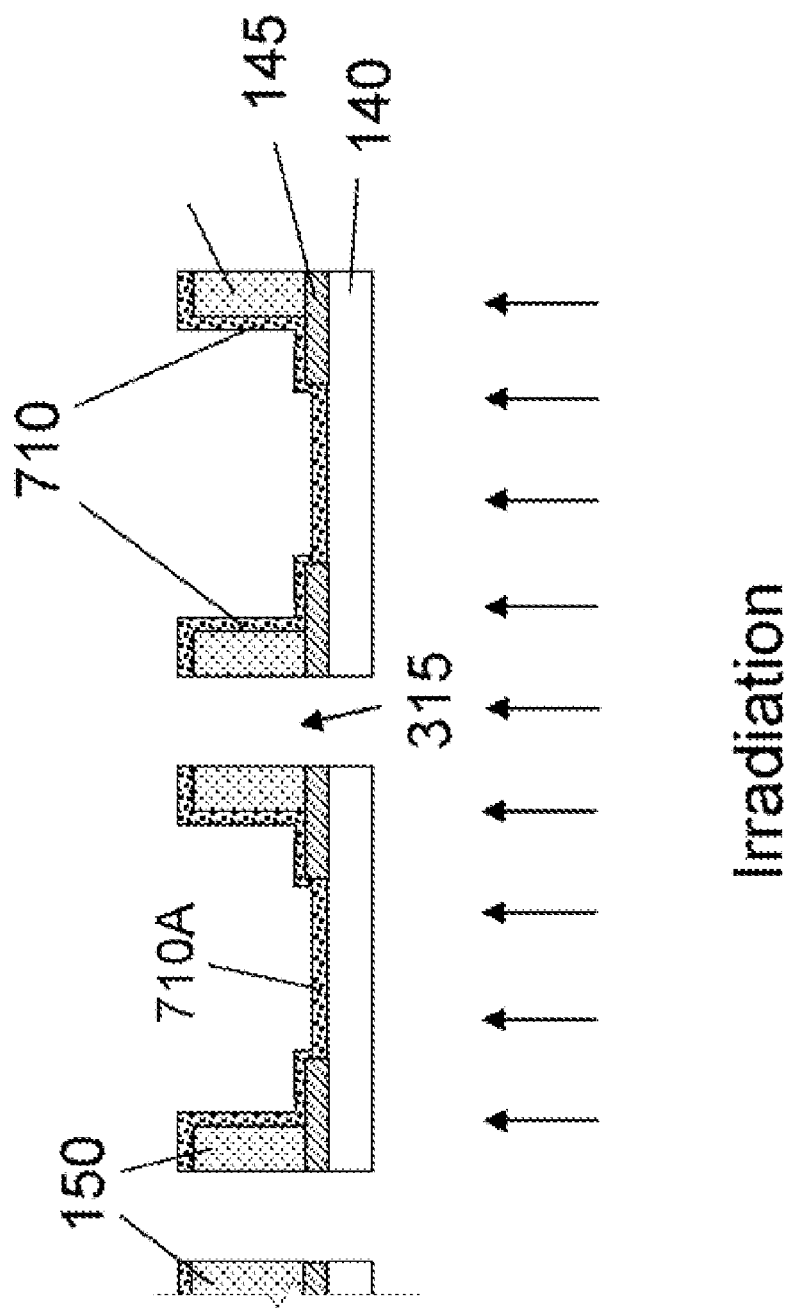
Figure 7F:
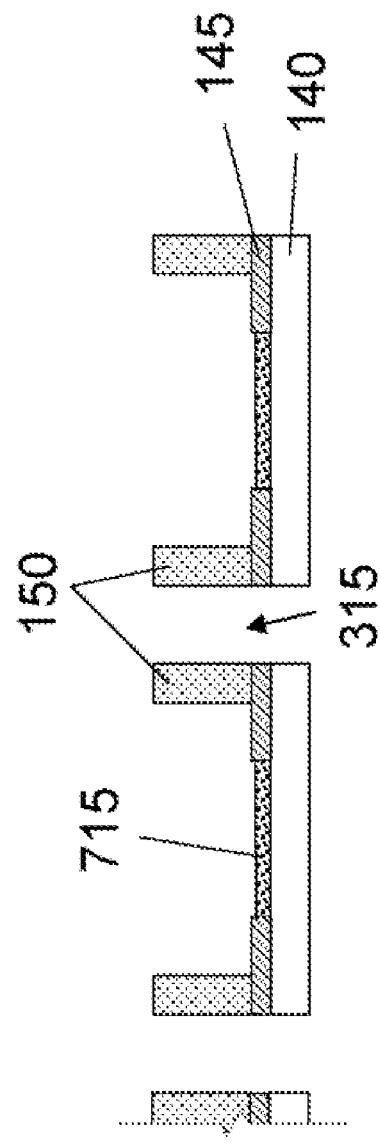

A negative photo resist is next spin-coated on the spacer walls 150 and the aperture layer 145, and the portion of the encapsulation cover 140 in the apertures 148 (FIG. 7D, step 540). A photo resist layer 710 is formed on the surfaces of the spacer walls 150 and the aperture layer 145. A portion 710A of the photo resist layer is formed within the apertures 148. Photon irradiation is next applied from the side of the encapsulation cover 140 that is opposite to the photo resist layer 710 (FIG. 7E, step 550). Since the aperture layer 145 is opaque and the encapsulation cover 140 is transparent, only the portion 710A of the photo resist layer 710 in the aperture 148 is exposed to the photon irradiation. The photo resist layer 710A is subsequently cured by baking. The photo resist layer 710 is then removed by a developer while a cured photo resist layer 715 remains on the portion of the encapsulation cover 140 that is within the apertures 148 (FIG. 7F, step 560).

Figure 7G:
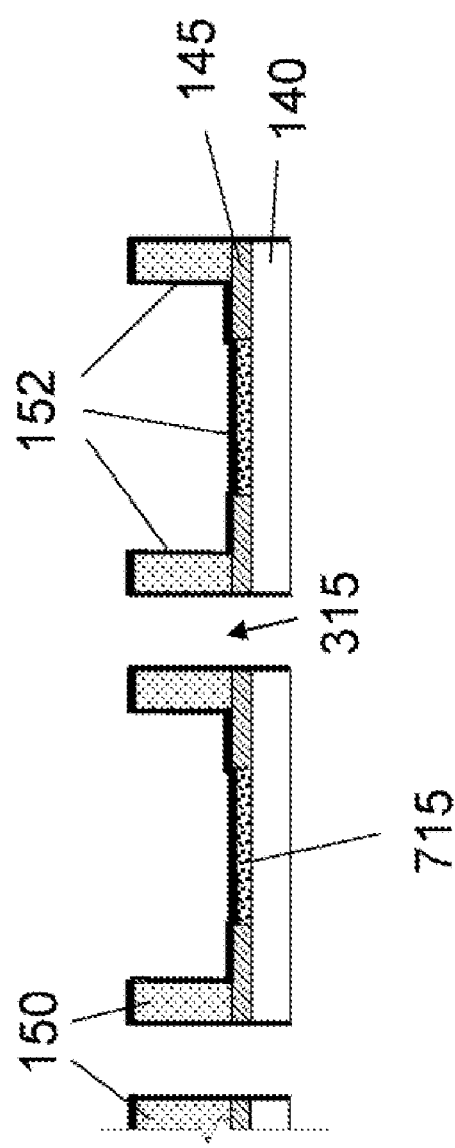

A layer of light absorbing material is next deposited on the surfaces of the spacer walls 150 and the aperture layer 145, and the cured photo resist layer 715 (FIG. 7G, step 570). The light absorbing material can also absorb moisture. Suitable light absorbing material can include a zirconium compound such as zirconium oxide and zirconium nitride and amorphous carbon. The light absorbing material can be anisotropically deposited using chemical vapor deposition (CVD). In some embodiments, the aperture layer 145 and the layer 152 can have substantially the same the material compositions. In this case, the aperture layer 145 and the layer 152 can form a single layer.

Figure 7H:
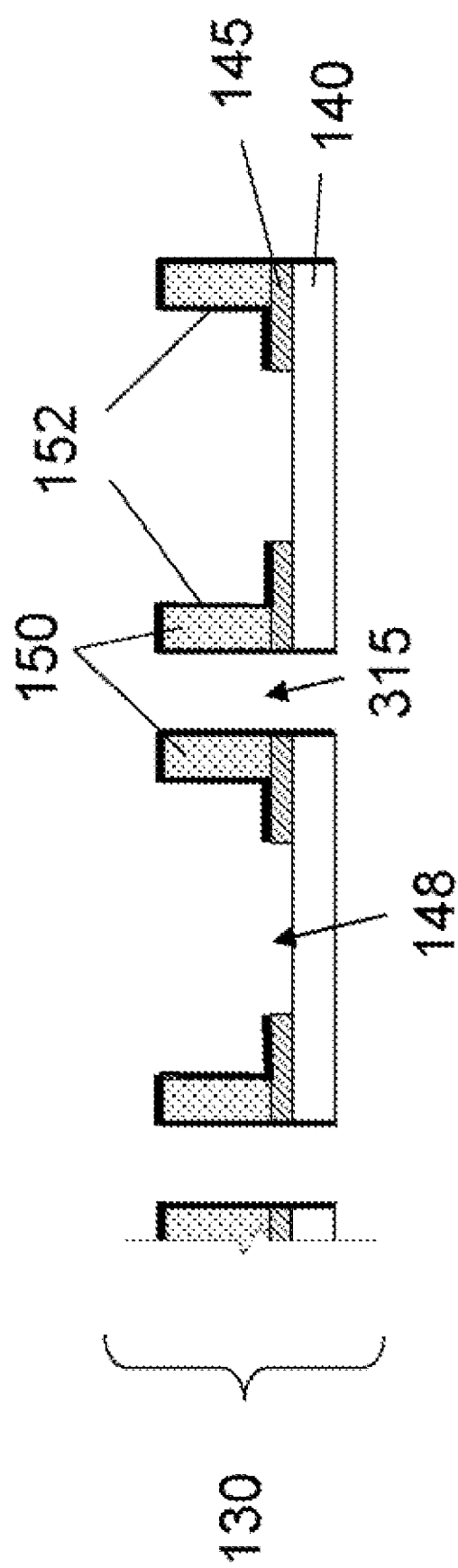

An encapsulation device 130 is finally formed by lifting off the cured photo resist layer 715 and the portion of the light absorbing material 152 on the cured photo resist layer 715 (FIG. 7H, step 580).

Figure 7I:
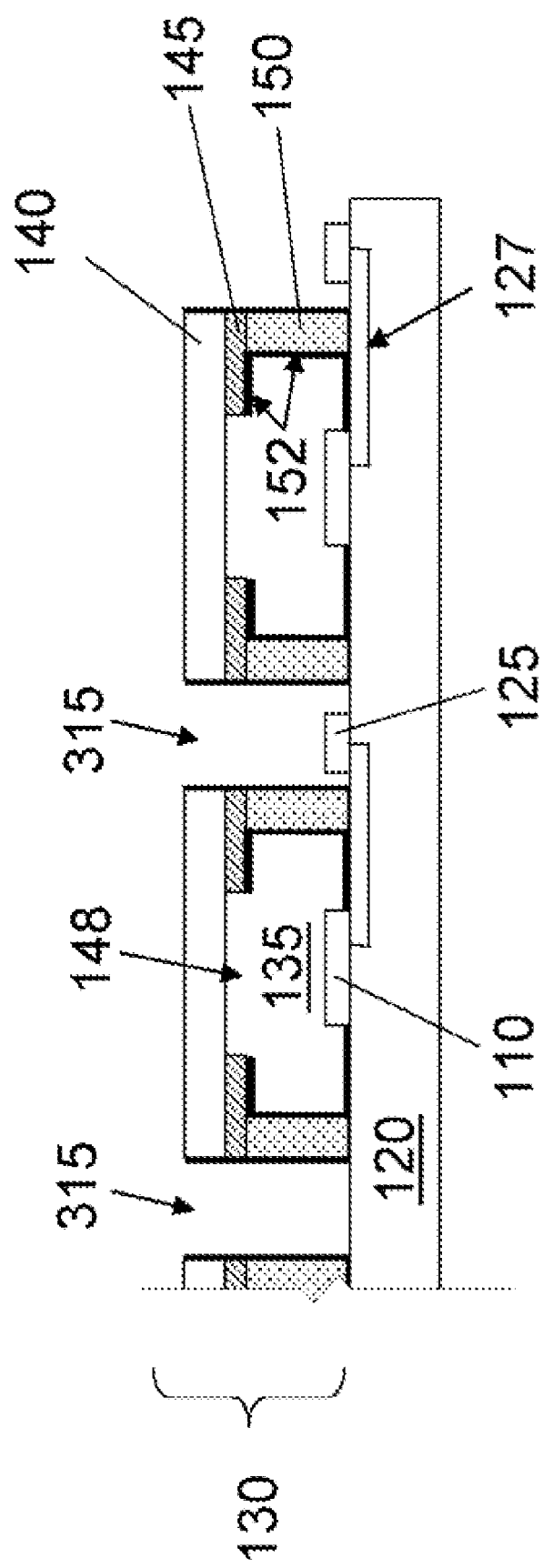

The encapsulation device 130 can then be used to encapsulate a plurality of spatial light modulators 110 on the substrate 120 (FIG. 7I, step 590). The surfaces of the spacer walls 150 are sealed to the upper surface of the substrate 120 with a polymer adhesive, such as epoxy or bonded to the upper surface of the substrate 120 by plasma bonding. A plurality of chambers 135 are thereby formed, each encapsulating one or more spatial light modulators 110. One or more electric contacts 125 are positioned on the substrate 120 in the opening 315 next to each chamber 135. The substrate 120 and the encapsulation cover 140 can then be diced to form individual dies each containing an encapsulated spatial light modulator 110 (step 600).

The above disclosed methods and devices may include one or more of the following advantages. The apertures in the aperture layer can be formed with precise sizes and positions because the apertures are defined by the openings in the shadow mask. Positional and dimensional errors in the aperture formation can thus be reduced. The disclosed systems and methods can also allow a single layer to function as an aperture layer for blocking light and a getter layer for absorbing moisture.

The disclosed spatial light modulators can have improved optical performances. Unwanted light may be absorbed in a micro chamber that encapsulates the spatial light modulator. The optical noise in the output optical signal can therefore be reduced. The contrast between an "on" state and an "off" state of the spatial light modulator may also be increased. The specification also discloses manufacturing processes for encapsulation devices that include light absorbing components that can absorb the unwanted light in the chambers. Furthermore, a plurality of spatial light modulators on a substrate can be encapsulated in a common process. The manufacturing efficiency is thus improved.

It is understood that the disclosed systems and methods are compatible with other micro devices such as light emitting devices and optical sensors. The spatial light modulators compatible with the disclosed systems and methods are also not limited to tiltable micro mirrors. The disclosed systems and methods are compatible with other getter materials and other light absorbing materials, and other processes for introducing the light-absorbing materials in the chambers. The shadow mask can have different configuration while still achieving the same purpose. For example, the connector portions in the shadow mask can have different numbers and be cross different positions the openings.

The encapsulation cover and the spacer walls can be made of different materials and formed by different processes. The spacer walls can be connected to the encapsulation cover and the substrate by different sealing or bonding techniques. The spatial light modulators compatible with the disclosed system and methods can include many optical devices other than tiltable micro mirrors. The tiltable mirrors can be tilted to more positions than the disclosed on and off position. The tiltable mirrors may not include mechanical stops for stopping the tilt movement of the mirror plates. The positions of the tiltable mirrors may be defined by balances between electrostatic forces and elastic forces. The relative positions, form factors, dimensions, and shapes of the chambers, the spatial light modulators, and the electric contact can also vary without deviating from the present application.

What is claimed is:

1. A method for fabricating an encapsulation device for encapsulating a micro device, comprising:
   holding a shadow mask over an encapsulation cover having a plurality of openings, wherein the shadow mask includes a base mask portion, one or more openings in the base mask portion, a central mask portion, and one or more connector portions connecting the central mask portion to the base mask portion;
   aligning the position of the shadow mask relative to one or more openings in the encapsulation cover;
   depositing one or more target materials through the one or more openings in the shadow mask to form a layered structure on the encapsulation cover, wherein the layered structure comprises an opening defined by the central mask portion of the shadow mask; and
   forming one or more spacer walls on the layered structure on the encapsulation cover.

2. The method of claim 1, wherein the step depositing comprises:
   sputtering one or more target materials from one or more targets; and
   depositing one or more target materials in a vacuum or a gas environment.

3. The method of claim 2, wherein the gas includes oxygen or nitrogen.

4. The method of claim 2, wherein the target materials include zirconium, chromium, or carbon.

5. The method of claim 1, wherein the layered structure comprises a zirconium compound, chromium oxide, or amorphous carbon.

6. The method of claim 1, wherein the layered structure comprises a plurality of portions separated by recess channels that correspond to the one or more connector portions in the shadow mask.

7. The method of claim 1, further comprising disposing on the spacer walls a material configured to absorb light and moisture in the chamber.

8. The method of claim 1, wherein the step of forming spacer walls comprises:
   forming a conductive layer on the encapsulation cover;
   forming on the conductive layer a mask layer comprising a plurality of openings; and
   electroplating the conductive layer to form the spacer walls on the conductive layer and in the openings of the mask layer.

9. The method of claim 1, wherein the micro device is a spatial light modulator.

10. The method of claim 9, wherein the micro device includes a tiltable micro mirror.

11. A method of forming an encapsulated micro device, comprising:
    performing the method of claim 1; and
    connecting the spacer walls to a surface of a substrate having one or more micro devices to form a plurality of chambers on the substrate with each chamber including at least one micro device.

12. The method of claim 11, wherein the spacer walls are sealed to the surface of the substrate by an adhesive or bonded to the surface of the substrate by plasma bonding.

13. The method of claim 11, further comprising cutting a portion of the substrate and a portion of the encapsulation cover to form two or more dies each containing at least one chamber encapsulating a micro device.

14. A method for fabricating an encapsulation device for encapsulating a micro device, comprising:
    holding a shadow mask over an encapsulation cover having a plurality of openings, wherein the shadow mask includes a base mask portion, one or more openings in the base mask portion, a central mask portion, and one or more connector portions connecting the central mask portion to the base mask portion;
    aligning the position of the shadow mask relative to one or more openings in the encapsulation cover such that a least one of the plurality of openings in the shadow mask is not positioned directly above the one or more openings in the encapsulation cover;
    depositing one or more target materials through the one or more openings in the shadow mask to form a layered structure on the encapsulation cover, wherein the layered structure comprises an opening defined by the central mask portion of the shadow mask; and forming one or more spacer walls on the layered structure on the encapsulation cover.

15. The method of claim 14, wherein the shadow mask is aligned such that the base mask portion is positioned above at least one opening in the encapsulation cover.

16. The method of claim 14, wherein the shadow mask comprises three or more connector portions connecting the central mask portion to the base mask portion.

17. The method of claim 14, wherein the step depositing comprises:

sputtering one or more target materials from one or more targets; and depositing one or more target materials in a vacuum or a gas environment.

18. The method of claim 17, wherein the gas includes oxygen or nitrogen.

19. The method of claim 17, wherein the target materials include zirconium, chromium, or carbon.

20. The method of claim 14, wherein the layered structure comprises a zirconium compound, chromium oxide, or amorphous carbon.

21. The method of claim 14, wherein the layered structure comprises a plurality of portions separated by recess channels that are positioned under the one or more connector portions in the shadow mask during the step of aligning.

22. The method of claim 14, further comprising disposing on the spacer walls a material configured to absorb light and moisture in the chamber.

23. The method of claim 14, wherein the step of forming spacer walls comprises:

forming a conductive layer on the encapsulation cover;

forming on the conductive layer a mask layer comprising a plurality of openings; and electroplating the conductive layer to form the spacer walls on the conductive layer and in the openings of the mask layer.

24. The method of claim 14, wherein the micro device is a spatial light modulator.

25. The method of claim 24, wherein the micro device includes a tiltable micro mirror.

26. The method of claim 25, wherein the tiltable mirror is configured to reflect light out of the chamber through the opening in the layered structure when the tiltable mirror is at the on position, and is configured to reflect light toward a light absorbing material in the chamber when the tiltable mirror is at the off position wherein reflected light is absorbed by the light absorbing material.

27. The method of claim 14, wherein the layered structure comprises a single layer.

28. The method of claim 14, wherein the layered structure comprises:

an opaque aperture layer on the encapsulation cover; and a second layer on the aperture layer, the second layer being configured to absorb light and moisture in the chamber.

29. A method for fabricating an encapsulation device for encapsulating a micro device, comprising:

holding a shadow mask over an encapsulation cover having a plurality of openings, wherein the shadow mask includes a base mask portion, one or more openings in the base mask portion, a central mask portion, and three or more connector portions connecting the central mask portion to the base mask portion;

aligning the position of the shadow mask relative to one or more openings in the encapsulation cover such that the base mask portion is positioned above at least one opening in the encapsulation cove and a least one of the plurality of openings in the shadow mask is not positioned directly above the one or more openings in the encapsulation cover;

depositing one or more target materials through the one or more openings in the shadow mask to form a layered structure on the encapsulation cover, wherein the layered structure comprises an opening defined by the central mask portion of the shadow mask;

forming one or more spacer walls on the layered structure on the encapsulation cover;

forming a conductive layer on the encapsulation cover;

forming on the conductive layer a mask layer comprising a plurality of openings; and electroplating the conductive layer to form the spacer walls on the conductive layer and in the openings of the mask layer.

* * * * *